United States Patent
Agarwal et al.

(10) Patent No.: US 10,866,103 B2
(45) Date of Patent: Dec. 15, 2020

(54) VEHICLE PERCEPTION-DATA GATHERING SYSTEM AND METHOD

(71) Applicant: Aptiv Technologies Limited, St. Michael (BB)

(72) Inventors: Divya Agarwal, Sunnyvale, CA (US); Michael H. Laur, Mission Viejo, CA (US); Brian R. Hilnbrand, Mountain View, CA (US)

(73) Assignee: Aptiv Technologies Limited, St. Michael (BB)

( * ) Notice: Subject to any disclaimer, the term of this patent is extended or adjusted under 35 U.S.C. 154(b) by 270 days.

(21) Appl. No.: 15/897,566

(22) Filed: Feb. 15, 2018

(65) Prior Publication Data

US 2019/0249999 A1 Aug. 15, 2019

Related U.S. Application Data

(60) Provisional application No. 62/629,203, filed on Feb. 12, 2018.

(51) Int. Cl.
| | |
|---|---|
| *G01C 21/34* | (2006.01) |
| *G08G 1/16* | (2006.01) |
| *G08G 1/0968* | (2006.01) |
| *G01C 21/36* | (2006.01) |
| *B60W 30/00* | (2006.01) |
| *G05D 1/00* | (2006.01) |

(52) U.S. Cl.
CPC .......... *G01C 21/34* (2013.01); *B60W 30/00* (2013.01); *G01C 21/3407* (2013.01); *G01C 21/3602* (2013.01); *G08G 1/096861* (2013.01); *G08G 1/161* (2013.01); *G08G 1/162* (2013.01); *G08G 1/167* (2013.01); *G05D 1/0088* (2013.01)

(58) Field of Classification Search
CPC ................ G01C 21/34; G01C 21/3602; G01C 21/3407; G08G 1/162; G08G 1/096861; G08G 1/167; G08G 1/161; G08G 1/166; B60W 30/00; G05D 1/0088; H04B 1/40; G08C 17/02; H04W 4/029; H04W 4/40
See application file for complete search history.

(56) References Cited

U.S. PATENT DOCUMENTS

2017/0243485 A1* 8/2017 Rubin ..................... G08G 1/052
2017/0369055 A1 12/2017 Saigusa et al.

OTHER PUBLICATIONS

European Search Report for Application No. 19155815.4, European Patent Office, dated Jun. 21, 2019.

* cited by examiner

*Primary Examiner* — Basil T. Jos
(74) *Attorney, Agent, or Firm* — Colby Nipper PLLC

(57) ABSTRACT

A system for gathering perception-data includes a transceiver and a controller-circuit. The transceiver is for installation on a host-vehicle. The transceiver is configured to receive perception-data from a perception-sensor installed on an assisting-vehicle proximate to the host-vehicle. The controller-circuit is in communication with the transceiver. The controller-circuit is configured to determine a preferred-perspective for gathering perception-data by the perception-sensor of the assisting-vehicle, and operate the transceiver to transmit a path-request to the assisting-vehicle that changes a planned-path of the assisting-vehicle to move the perception-sensor of the assisting-vehicle to the preferred-perspective.

20 Claims, 3 Drawing Sheets

VEHICLE PERCEPTION-DATA GATHERING SYSTEM AND METHOD

TECHNICAL FIELD OF INVENTION

This disclosure generally relates to a system for gathering vehicle perception-data, and more particularly relates to a system that transmits a path-request from a host-vehicle to an assisting-vehicle that changes a planned-path of the assisting-vehicle to move a perception-sensor of the assisting-vehicle to the preferred-perspective for collecting perception for use by the host-vehicle.

BACKGROUND OF INVENTION

Situations occur where a field-of-view of sensors on an automated vehicle are obstructed by some object, so the automated vehicle is unable to gather perception-data regarding objects in that field-of-view.

BRIEF DESCRIPTION OF DRAWINGS

The present invention will now be described, by way of example with reference to the accompanying drawings, in which.

DETAILED DESCRIPTION

Figure 1:
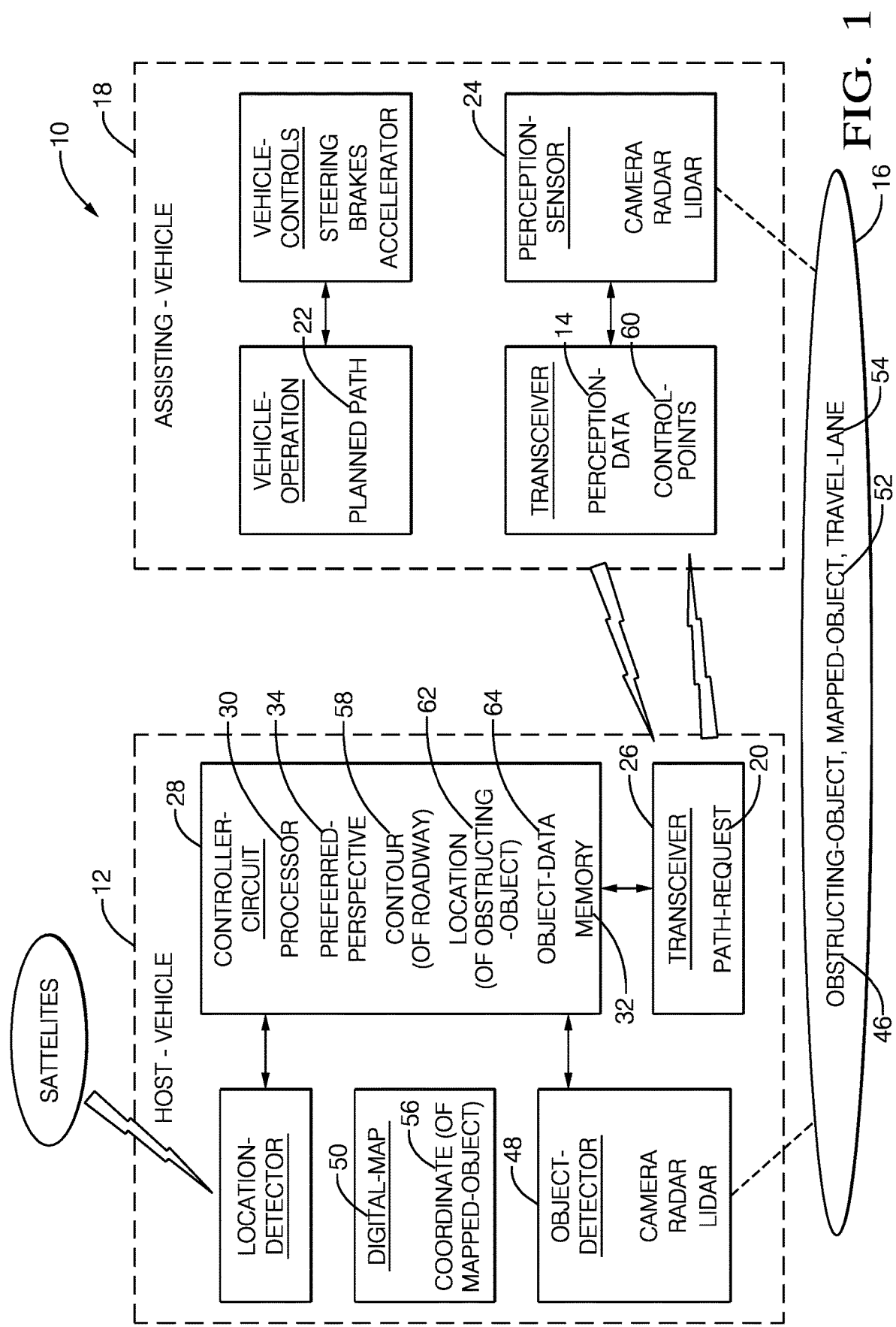
FIG. 1 is a diagram of a system for gathering vehicle perception-data in accordance with one embodiment.

FIG. 1 illustrates a non-limiting example of a system 10 for gathering vehicle related perception-data 14 used to operate a host-vehicle 12. As used herein, perception-data may be any type of information useful to operate (e.g. steer, brake, accelerate) the host-vehicle 12 while, for example, traveling a roadway 16. By way of example and not limitation, perception-data 14 may include locations (e.g. relative-position with respect to a sensor or detector, or absolute-location, i.e. GPS coordinates) of lane-markers, signs, traffic-signals, other-vehicles, buildings, etc. Perception-data 14 may come from a variety of sources such as sensors on board the host-vehicle 12 (e.g. image or video from a camera, radar-map from a radar, point-cloud from a lidar, or any combination thereof), or sensors that are part of infrastructure (e.g. a traffic-camera located at an intersection), or sensors/detectors located on other vehicles. As will described in more detail below, a point of novelty for the system 10 described herein is that the host-vehicle 12 receives perception-data 14 collected by an assisting-vehicle 18, and that the host-vehicle 12 sends a path-request 20 to the assisting-vehicle 18 to alter a planned-path 22 of assisting-vehicle 18 so that perception-data 14 collected by the assisting-vehicle 18 is from a different (better) perspective-view of an area or object on or near the roadway 16. That is, the path-request 20 asks the assisting-vehicle 18 to take some action (e.g. accelerate, slow-down, change lanes) so perception-data 14 collected by perception-sensors 24 on the assisting-vehicle 18 is collected from a better or improved perspective, i.e. in accordance with perception-data desired by the host-vehicle 12.

The host-vehicle 12 may be characterized as an automated vehicle. As used herein, the term automated vehicle may apply to instances when the host-vehicle 12 is being operated in an automated-mode, i.e. a fully autonomous mode, where a human-operator (not shown) of the host-vehicle 12 may do little more than designate a destination to operate a fully-autonomous instance of the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as another-vehicle, a pedestrian, or a road sign.

The system 10 includes a transceiver 26 for installation, or to be installed, or already installed, on the host-vehicle 12. The transceiver 26 may communicate using any of many known protocols such as, but not limited to, dedicated-short-range-communications (DSRC), Wi-Fi, cellular phone networks, etc. The transceiver 26 is generally configured to receive perception-data 14 from the perception-sensor 24 (camera, radar, lidar, ultrasonic transducer, any combination thereof) installed on the assisting-vehicle 18 proximate to (e.g. within 200 meters of) the host-vehicle 12. While it is contemplated that it would be preferable for the assisting-vehicle 18 to be fully-automated, it is recognized that the assisting-vehicle 18 could be operated by a human-operator (not shown) who would respond appropriately to the path-request 20.

The system 10 includes a controller-circuit 28 in communication with the transceiver 26. The communication may be via a wired connection, wireless communications, or other known means that will be instantly recognized by those in the art. The controller 28 may include a processor 30 such as a microprocessor or other control circuitry such as analog and/or digital control circuitry including an application specific integrated circuit (ASIC) for processing data as should be evident to those in the art. Hereafter, any reference to the controller 28 being configured for something is to also be interpreted as suggesting that the processor 30 may also be configured for the same thing. The controller 28 may include memory 32 i.e. non-transitory computer-readable storage-medium, including non-volatile memory, such as electrically erasable programmable read-only memory (EEPROM) for storing one or more routines, thresholds, and captured data. The memory 32 may be part of the processor 30, or part of the controller 28, or separate from the controller 28 such as remote memory stored in the cloud. The one or more routines may be executed by the controller 28 or the processor 30 to perform steps for operating the host-vehicle 12 based on signals received by the controller 28 as described herein.

The controller-circuit 28 (or the processor 30) is generally configured to determine a preferred-perspective 34 (see also FIG. 2) for gathering perception-data 14 by the perception-sensor 24 of the assisting-vehicle 18. As used herein, the preferred-perspective 34 may be characterized as a location from which perception-data could be collected that provides the host-vehicle 12 with better information about objects on or near the roadway 16. For example, the preferred-perspective 34 may be selected so a portion of the roadway 16 obstructed from being viewed from the host-vehicle 12 can be viewed from the assisting-vehicle 18.

Figure 2:
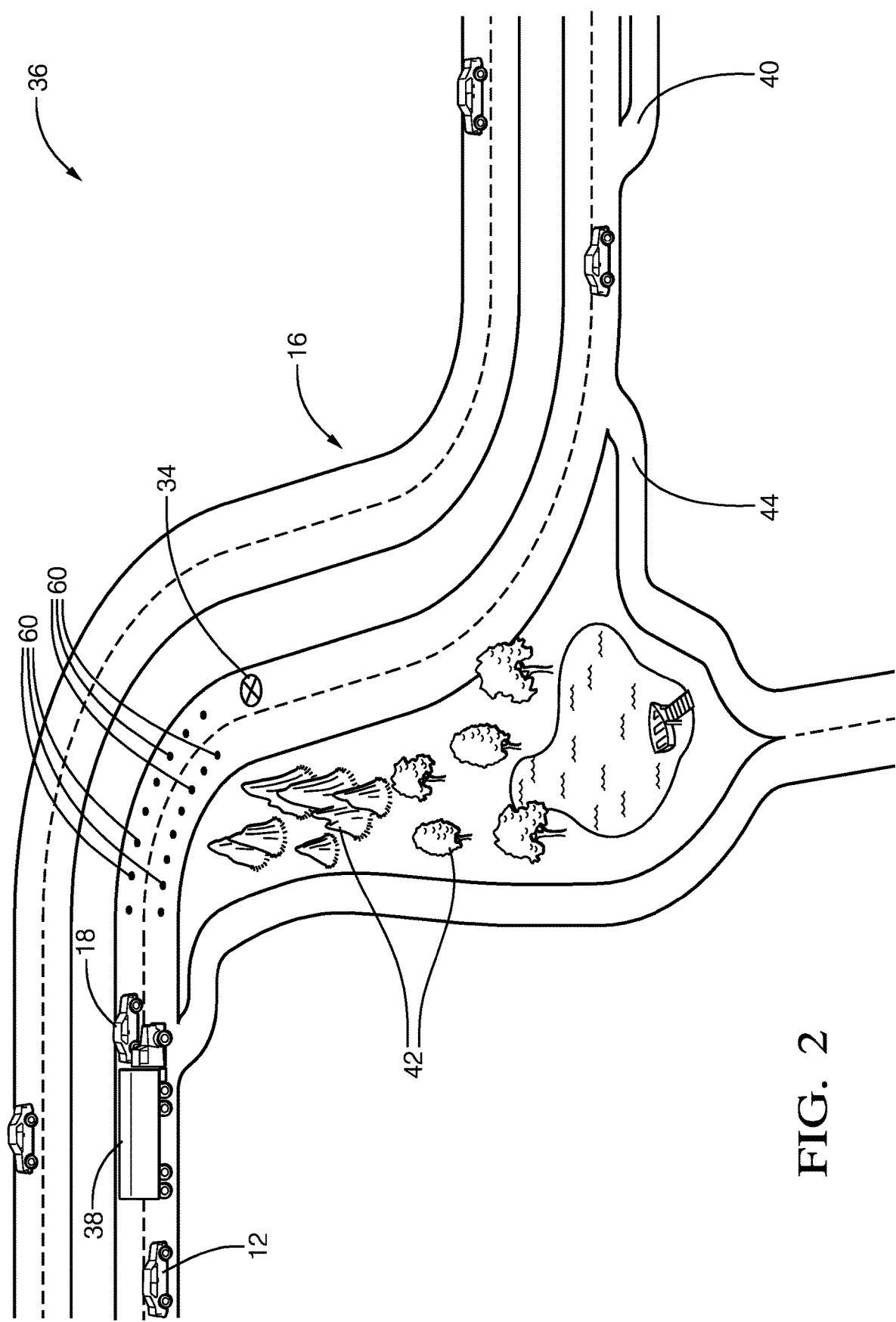
FIG. 2 is a scenario encountered by the system of FIG. 1 in accordance with one embodiment.

FIG. 2 illustrates a non-limiting example of a scenario 36 that the host-vehicle 12 may encounter while traveling the roadway 16. In this example, the host-vehicle 12 is following a truck 38 in the right-hand lane, and the assisting-vehicle 18 is traveling in the left-hand lane a short distance ahead of the host-vehicle 12. The host-vehicle 12 may intend to exit the roadway 16 at an upcoming instance of an exit-ramp 40, but the truck 38 is traveling slower than a desired-speed of the host-vehicle 12. However, because the field-of-view of an object-detector 48 (FIG. 1) on the host-vehicle 12 is blocked by the truck 38, the host-vehicle 12 is unable to, by itself (i.e. using only on-board sensors of the object-detector 48), determine if the truck 38 can be passed successfully before reaching the exit-ramp 40. Even though the assisting-vehicle 18 has a clear forward field-of-view for the perception-sensor 24 of the assisting-vehicle 18, the perception-sensor 24 is unable to see around the curves of the roadway 16 because of the presence of land-features 42 blocking the view of the exit-ramp 40.

The controller 28 determines the preferred-perspective 34 for viewing the roadway 16 to the exit-ramp 40 to determine if there are already numerous vehicles in the right-hand lane ahead of the truck and/or numerous vehicles entering the roadway 16 from an entrance-ramp 44. E.g., if the right-hand lane approaching the exit-ramp 40 has numerous vehicles present that would make it difficult for the host-vehicle 12 to enter the right-hand lane after passing the truck 38, then the host-vehicle 12 may decide to stay behind the truck 38.

Having determined the preferred-perspective 34, the controller 28 then operates the transceiver 26 to transmit the path-request 20 to the assisting-vehicle 18 that changes the planned-path 22 of the assisting-vehicle 18 to move (e.g. steer and/or accelerate/decelerate) the perception-sensor 24 of the assisting-vehicle 18 to the preferred-perspective 34. The controller 28 may estimate the planned-path 22 of the assisting-vehicle 18 based on observation of the assisting-vehicle 18, e.g. based on extrapolation from a present-trajectory, or based on forecasted-trajectory broadcast from the assisting-vehicle 18. The path-request 20 may include, but is not limited to, a lane-change, a speed-change, a position-change within a present lane, or maintain a relative orientation between the host-vehicle 12 the assisting-vehicle 18 until an obstructing-vehicle (not shown) obstructing a lane change is out of the way. In this instance, for the scenario 36, the path-request 20 may ask the assisting-vehicle 18 to accelerate to reach the preferred-perspective as quickly as possible so the host-vehicle 12 has as much time as possible to pass the truck 38.

The system 10 may include an object-detector 48 for installation, or to be installed, or already installed, on the host-vehicle 12. The object-detector 48 could be same or different configuration as perception-sensor 24 on assisting-vehicle 18. The use of the terms object-detector and perception-sensor herein is only to help the reader to distinguish sensors associated with the assisting-vehicle 18 from sensors associated with the host-vehicle 12, and not to suggest that there is necessarily a difference of configuration between the perception-sensor 24 and the object-detector 48. The controller-circuit 28 may be is configured to determine the preferred-perspective 34 in accordance with a location 62 of an obstructing-object 46 (FIG. 1), e.g. the truck 38, the land-features 42, other-vehicles (not shown), and/or pedestrians/bicyclists (not shown), detected by the object-detector 48. For example, the obstructing-object 46 may prevent the object-detector 48 on host-vehicle 12 from determining a lane-shape of the roadway, so the path-planning used for automated operation of the host-vehicle 12 may be operating with low confidence.

The system 10 may include a digital-map 50 that indicates the presence of a mapped-object 52 that may not be detected by the object-detector 48 the host-vehicle 12, or any off-board other-detectors in communication with the controller 28. The digital-map 50 may be stored on-board (i.e. in memory 32), or in the cloud, or both. Examples of the mapped-object 52 include, but are not limited to: a travel-lane, a reference-object (e.g. a post with well-known GPS coordinates), a building (not shown), a safe-stop zone, and/or a traffic-signal (not shown). The controller-circuit 28 may be configured to determine the preferred-perspective 34 in accordance with a coordinate 54 of the mapped-object 52 identified in the digital-map 50. For example, the obstructing-object 46 may prevent the object-detector 48 on host-vehicle 12 from determining if the mapped-object 52, which in this example is a safe-stop zone ahead, is available for use, so the path-planning used for automated operation of the host-vehicle 12 may be operating with low confidence.

In another embodiment, the controller-circuit 28 may be configured to determine a contour 58 of the roadway 16 traveled by the host-vehicle 12. As used herein, the contour 58 may characterize, for example, a lateral or horizontal (e.g. left/right) curvature of the roadway 16, a vertical curvature (e.g. instance of the roadway 16 cresting a hilltop) or any other shape of the roadway 16 that may prevent the object-detector 48 from being able to determine the shape of the roadway 16 to a desired distance away from the object-detector 48. The contour 58 may be indicated by object-detector 48 (at least partially), the digital-map 50, the perception-data 14 from assisting-vehicle 18, or any combination thereof. The controller 28 may then be configured to determine the preferred-perspective 34 for the perception-sensor 24 of the assisting-vehicle 18 in accordance with the contour 58. For example, as shown in FIG. 2, the curvature of the roadway 16 prevents direct observation of the exit-ramp from the position of the host-vehicle 12, so the path-request 20 asks the assisting-vehicle 18 to move to the preferred-perspective 34.

In another embodiment, the perception-data 14 may include control-points 60 that are characteristic or descriptive of the travel-lane 54. The travel-lane 54 could be the present-lane traveled by the host-vehicle 12 or the assisting-vehicle 18, an adjacent-lane, or any other-lane proximate to the host-vehicle and viewable by the perception-sensor 24 of the assisting-vehicle 18. That is, the host-vehicle 12 requests that the assisting-vehicle 18 maneuver to a position where lane-center data from the assisting-vehicle 18 can be supplied to the host-vehicle 12 for the goal of the host-vehicle 12 accomplishing a lane-change or avoidance-maneuver. The control-points 60 that may be indicated relative to GPS coordinates or relative to the digital-map 50. This information is sent from the assisting-vehicle to the host-vehicle, optionally along with position of any instance of an other-vehicle in front of the assisting-vehicle 18. The host-vehicle 12 has requested this information and may ask the assisting-vehicle 18 to maneuver to a position to supply data the host-vehicle 12 is not able to perceive. Trajectories of the host-vehicle 12 are typically calculated by the host-vehicle 12. In computer-aided geometric design a control-point is a member of a set of points used to determine the shape of a spline curve or, more generally, a surface or higher-dimensional object.

Figure 3:
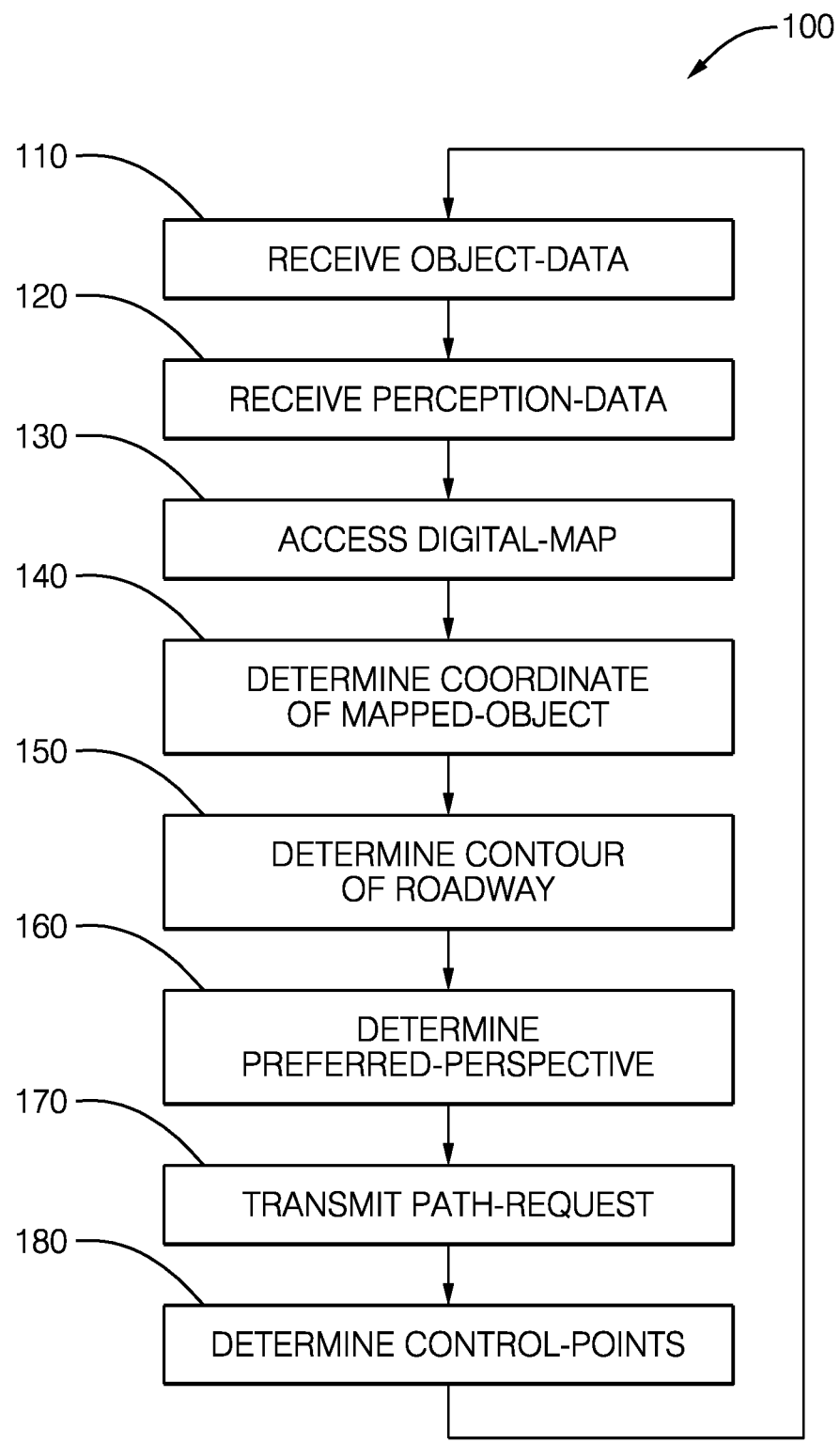
FIG. 3 is a method of operating the system of FIG. 1 in accordance with one embodiment.

FIG. 3 illustrates a non-limiting example of a method 100 of operating the system 10 for gathering the perception-data 14.

Step 110, RECEIVE OBJECT-DATA, may include receiving object-data 64 from the object-detector 48 mounted on the host-vehicle 12 if the host-vehicle 12 is so equipped. It is contemplated that if the object-detector 48 completely or partially fails, the perception-data 14 from the assisting-vehicle 18 may be the only way for the host-vehicle 12 to gather sufficient information to continue operate autonomously, possibly in some reduced capacity or limited manner.

Step 120, RECEIVE PERCEPTION-DATA, may include receiving, by a transceiver 26 of the host-vehicle 12, perception-data 14 from a perception-sensor 24 installed on an assisting-vehicle 18 proximate to the host-vehicle 12. While step 120 is shown as being early in the method 100, this is not a requirement as it is recognized that this step could be moved or duplicated at several places in the method 100.

Step 130, ACCESS DIGITAL-MAP, may include accessing the digital-map 50 that indicates the coordinate 56 of a mapped-object 52. If the mapped-object 52 is also indicated in the perception-data 14, then that information can be used to operate the host-vehicle 12.

Step 140, DETERMINE COORDINATE OF MAPPED-OBJECT, may include the controller 28 trying to match an object detected by the perception-sensor 24 and indicated in the perception-data 14 to an instance of the mapped-object 52 indicated in the digital-map 50. For example, an image from the camera of the perception-sensor 24 may be analyzed and it may be determined that an object in the image corresponds to a typical example of a reference-marker (standardized object provided for localization of automated vehicles). The digital-map 50 may then be accessed to determine if there is an instance of a reference-marker documented (e.g. the coordinate 56 is specified) in the digital-map 50 at or near the location of the object detected.

Step 150, DETERMINE CONTOUR OF ROADWAY, may include determining a contour 58 of a roadway 16 traveled by the host-vehicle 12. The contour 58 may be determine based on information from many sources including, but not limited to, the object-detector 48 of the host-vehicle 12, the perception-sensor 24 of the assisting-vehicle 18 (even if the assisting-vehicle 18 is not positioned at the preferred-perspective 34), and/or the digital-map 50.

Step 160, DETERMINE PREFERRED-PERSPECTIVE, may include determining, by the controller-circuit 28 (or the processor 30), which is in communication with the transceiver 26, a preferred-perspective 34 for gathering perception-data 14 by the perception-sensor 24 of the assisting-vehicle 18. The determination of the preferred-perspective 34 may be in accordance with (i.e. may take into consideration or may be based on), but not limited to, a location 62 of an obstructing-object 46 detected by the object-detector 48, the coordinate 56 of a mapped-object 52, the contour 58 of the roadway 16, or any combination thereof.

Step 170, TRANSMIT PATH-REQUEST, may include transmitting, by the transceiver 26, a path-request 20 to the assisting-vehicle 18 that changes a planned-path 22 of the assisting-vehicle 18 to move the perception-sensor 24 of the assisting-vehicle 18 to the preferred-perspective 34.

Step 180, DETERMINE CONTROL-POINTS, may include determining, by the assisting-vehicle 18, control-points 60 that are characteristic of, or descriptive of, a travel-lane 54 proximate to the host-vehicle 12.

Described herein is a first device 28 that includes one or more processors 30, a memory 32, and one or more programs 100 stored in memory, the one or more programs 100 including instructions for performing the method 100 of any one of claims 11-15.

Also, described herein is a non-transitory computer-readable storage-medium 32 comprising one or more programs 100 for execution by one or more processors 30 of a first device 28, the one or more programs including instructions which, when executed by the one or more processors 30, cause the first device to perform the method of any one of claims 11-15.

Accordingly, a system 10, a controller 28 for the system 10, and a method 100 of operating the system 10 are provided. The host-vehicle 12 transmits a request for the assisting-vehicle 18 to move to a position (the preferred-perspective 34) so that the assisting-vehicle 18 has a better view of an object or area that the object-detector 48 of the host-vehicle is unable to view, for any number of reasons.

While this invention has been described in terms of the preferred embodiments thereof, it is not intended to be so limited, but rather only to the extent set forth in the claims that follow.

We claim:

1. A system for gathering perception-data, said system comprising:
   a transceiver for installation on a host-vehicle, said transceiver configured to receive perception-data from a perception-sensor installed on an assisting-vehicle proximate to the host-vehicle; and
   a controller-circuit in communication with the transceiver, said controller-circuit configured to determine a preferred-perspective for gathering perception-data by the perception-sensor of the assisting-vehicle, and operate the transceiver to transmit a path-request to the assisting-vehicle that configures the assisting-vehicle to steer, accelerate, or decelerate to change a planned-path of the assisting-vehicle to move the perception-sensor of the assisting-vehicle to the preferred-perspective.

2. The system in accordance with claim 1, wherein the system includes an object-detector for installation on the host-vehicle, and the controller-circuit is configured to determine the preferred-perspective in accordance with a location of an obstructing-object detected by the object-detector.

3. The system in accordance with claim 1, wherein the system includes a digital-map, and the controller-circuit is configured to determine the preferred-perspective in accordance with a coordinate of a mapped-object identified in the digital-map.

4. The system in accordance with claim 1, wherein the controller-circuit is configured to determine a contour of a roadway traveled by the host-vehicle, and determine the preferred-perspective for the perception-sensor of the assisting-vehicle in accordance with the contour.

5. The system in accordance with claim 1, wherein the perception-data includes control-points characteristic of a travel-lane proximate to the host-vehicle.

6. A controller-circuit for a system for gathering vehicle perception-data, said controller-circuit comprising:
   a transceiver for installation on a host-vehicle, said transceiver configured to receive perception-data from a perception-sensor installed on an assisting-vehicle proximate to the host-vehicle; and
   a processor in communication with the transceiver, said processor configured to determine a preferred-perspective for gathering perception-data by the perception-sensor of the assisting-vehicle, and operate the transceiver to transmit a path-request to the assisting-vehicle that configures the assisting-vehicle to steer, accelerate, or decelerate to change a planned-path of the assisting-vehicle to move the perception-sensor of the assisting-vehicle to the preferred-perspective.

7. The controller-circuit in accordance with claim 6, wherein the processor is configured to receive object-data from an object-detector of the host-vehicle, and the controller-circuit is configured to determine the preferred-perspective in accordance with a location of an obstructing-object detected by the object-detector.

8. The controller-circuit in accordance with claim 6, wherein the processor is configured to communicate with a digital-map, and determine the preferred-perspective in accordance with a coordinate of a mapped-object identified in the digital-map.

9. The controller-circuit in accordance with claim 6, wherein the processor is configured to determine a contour of a roadway traveled by the host-vehicle, and determine the preferred-perspective for the perception-sensor of the assisting-vehicle in accordance with the contour.

10. The controller-circuit in accordance with claim 6, wherein the perception-data includes control-points characteristic of a travel-lane proximate to the host-vehicle.

11. A method of operating a system for gathering vehicle perception-data, said method comprising:
   receiving, by a transceiver for installation on a host-vehicle, perception-data from a perception-sensor installed on an assisting-vehicle proximate to the host-vehicle;
   determining, by a controller-circuit in communication with the transceiver, a preferred-perspective for gathering perception-data by the perception-sensor of the assisting-vehicle; and
   transmitting, by the transceiver, a path-request to the assisting-vehicle that configures the assisting-vehicle to steer, accelerate, or decelerate to change a planned-path of the assisting-vehicle to move the perception-sensor of the assisting-vehicle to the preferred-perspective.

12. The method in accordance with claim 11, wherein the method includes:
   receiving object-data from an object-detector; and
   determining the preferred-perspective in accordance with a location of an obstructing-object detected by the object-detector.

13. The method in accordance with claim 11, wherein the method includes:
   accessing a digital-map that indicates a coordinate of a mapped-object; and
   determining the preferred-perspective in accordance with the coordinate of the mapped-object.

14. The method in accordance with claim 11, wherein the method includes:
   determining a contour of a roadway traveled by the host-vehicle; and
   determining the preferred-perspective for the perception-sensor of the assisting-vehicle in accordance with the contour.

15. The method in accordance with claim 11, wherein the method includes:
   determining, by the assisting-vehicle, control-points characteristic of a travel-lane proximate to the host-vehicle.

16. The method in accordance with claim 11, wherein transmitting the path-request configures the assisting-vehicle to accelerate to improve quality of the perception-data collected by the perception-sensor on the assisting-vehicle.

17. The method in accordance with claim 11, wherein transmitting the path-request configures the assisting-vehicle to slow-down to improve quality of the perception-data collected by the perception-sensor on the assisting-vehicle.

18. The method in accordance with claim 11, wherein transmitting the path-request configures the assisting-vehicle to steer from one traffic lane to another traffic lane to improve quality of the perception-data collected by the perception-sensor on the assisting-vehicle.

19. The method in accordance with claim 11, wherein transmitting the path-request includes transmitting a specific request from a group including a lane-change, a speed-change, a position-change within a present lane, and a position-maintain between the host-vehicle and the assisting-vehicle until the host-vehicle determines that an obstructing-vehicle is out of the way of the preferred-perspective.

20. The method in accordance with claim 11, wherein transmitting the path-request includes transmitting a speed-change that configures the assisting-vehicle to reach the preferred-perspective as quickly as possible when the host-vehicle passes an obstructing-vehicle in the way of the preferred-perspective.

* * * * *